(12) United States Patent
Shiraki et al.

(10) Patent No.: US 9,110,441 B2
(45) Date of Patent: Aug. 18, 2015

(54) CARTRIDGE DETACHABLY MOUNTED ON MAIN CASING

(71) Applicants: Masatoshi Shiraki, Nagoya (JP); Fumikazu Sato, Konan (JP)

(72) Inventors: Masatoshi Shiraki, Nagoya (JP); Fumikazu Sato, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/138,247

(22) Filed: Dec. 23, 2013

(65) Prior Publication Data

US 2014/0105638 A1    Apr. 17, 2014

Related U.S. Application Data

(63) Continuation of application No. 12/632,914, filed on Dec. 8, 2009, now Pat. No. 8,620,180.

(30) Foreign Application Priority Data

Dec. 8, 2008 (JP) .................................. 2008-312011

(51) Int. Cl.
    G03G 15/00    (2006.01)
    G03G 21/18    (2006.01)
    C02F 1/463    (2006.01)

(52) U.S. Cl.
    CPC ............ G03G 21/1853 (2013.01); C02F 1/463 (2013.01); G03G 21/1828 (2013.01);
    (Continued)

(58) Field of Classification Search
    CPC .......... G03G 21/1676; G03G 21/1647; G03G 21/16; G03G 21/1857; G03G 21/186; G03G 15/0896; G03G 2221/1657

USPC .......................... 399/111, 113, 119, 167, 227
See application file for complete search history.

(56) References Cited

U.S. PATENT DOCUMENTS 6,816,692 B1    11/2004    Kerley et al.
6,823,160 B2    11/2004    Okabe (Continued)

FOREIGN PATENT DOCUMENTS

JP    2000-127205 A    5/2000
JP    2000-227717 A    8/2000

(Continued)

OTHER PUBLICATIONS

Japanese Office Action mailed Oct. 12, 2010 in Patent Application No. 2008-312011 and English translation thereof.

(Continued)

*Primary Examiner* — Walter L Lindsay, Jr.
*Assistant Examiner* — Jessica L Eley
(74) *Attorney, Agent, or Firm* — Banner & Witcoff, Ltd.

(57) ABSTRACT

A cartridge is detachably mountable on a main casing. The main casing is provided with a coupling member providing a driving force. The cartridge comprises: a first roller extending in a first direction and configured to rotate about a first rotational axis; a driving force receiving portion configured to receive the driving force from the coupling member to drive the first roller and rotate about a second rotational axis, the driving force receiving portion comprising a contact portion configured to be in contact with the coupling member; and a first gear comprising a gear tooth, the gear being configured to transmit the driving force received at the driving force receiving portion to the first roller. The contact portion is overlapped with the gear tooth when projected in the first direction.

17 Claims, 8 Drawing Sheets

(52) U.S. Cl.
CPC ............ *G03G21/1857* (2013.01); *G03G 21/18* (2013.01); *G03G 2221/1657* (2013.01); *G03G 2221/1815* (2013.01)

(56) References Cited

U.S. PATENT DOCUMENTS

| | | | |
|---|---|---|---|
| 7,212,773 | B2 | 5/2007 | Sudo et al |
| 7,348,540 | B2 | 3/2008 | Mogi et al. |
| 2005/0063735 | A1* | 3/2005 | Okabe ............................ 399/222 |
| 2005/0111882 | A1 | 5/2005 | Sudo et al. |
| 2006/0171739 | A1* | 8/2006 | Nakaya .......................... 399/119 |
| 2007/0131856 | A1 | 6/2007 | Mogi et al. |
| 2007/0147852 | A1* | 6/2007 | Aratachi .......................... 399/12 |
| 2011/0158704 | A1* | 6/2011 | Takagi et al. ................. 399/279 |
| 2013/0051833 | A1* | 2/2013 | Itabashi et al. ................. 399/90 |

FOREIGN PATENT DOCUMENTS

| | | |
|---|---|---|
| JP | 2003-295614 A | 10/2003 |
| JP | 2004-354790 A | 12/2004 |
| JP | 2005-114159 A | 4/2005 |
| JP | 2006-251269 A | 9/2006 |
| JP | 2007-183565 A | 7/2007 |

OTHER PUBLICATIONS

Dec. 19, 2014—(EP) Extended Search Report—App 09178351.4, Eng Tran.

* cited by examiner

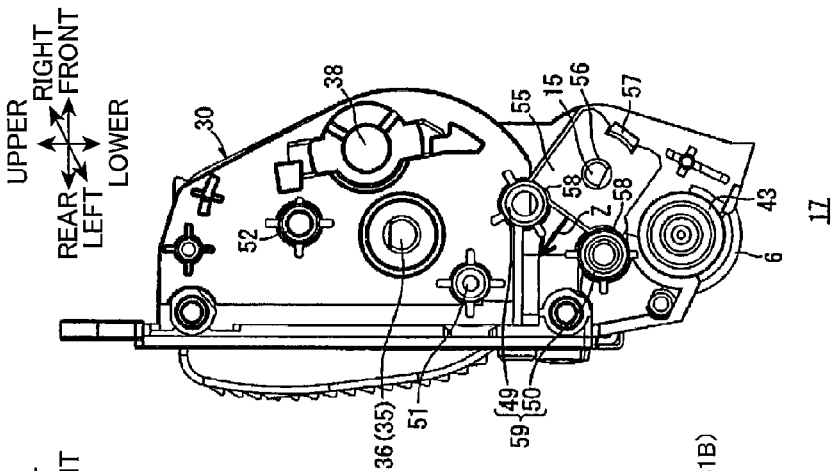
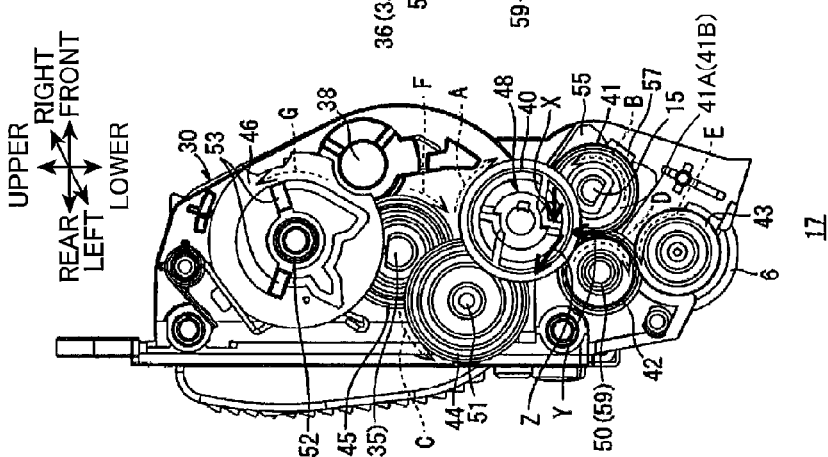
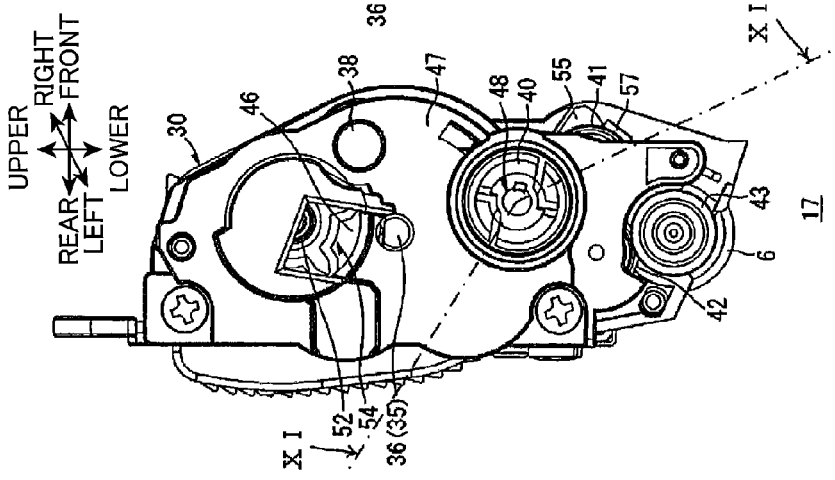

CARTRIDGE DETACHABLY MOUNTED ON MAIN CASING

CROSS REFERENCE TO RELATED APPLICATION

This application is a continuation of U.S. application Ser. No. 12/632,914, filed Dec. 8, 2009, which claims priority from Japanese Patent Application No. 2008-312011 filed Dec. 8, 2008. The entire content of the priority applications is incorporated herein by reference.

TECHNICAL FIELD

The present invention relates to a process cartridge and a developing cartridge mounted in an electrophotographic image forming device.

BACKGROUND

A conventional developing cartridge mounted in an image forming device includes a toner hopper, a supply roller and a developing roller. Toner accommodated in the toner hopper is supplied to the supply roller and then to the developing roller. The developing roller and the supply roller are respectively provided with a drive gear, while the developing cartridge itself is provided with an input gear to which driving force from a motor of the image forming device is transmitted via a coupling member. The input gear is meshingly engaged with each of the drive gears. With this configuration, the driving force from the motor is transmitted to both drive gears simultaneously via the coupling member and the input gear, thereby rotating the supply roller and the developing roller.

SUMMARY

There is a recent demand that the developing cartridge be made smaller. Simply making each component of the developing cartridge compact inevitably leads to smaller gears to be provided in the developing cartridge.

However, as a consequence of each gear becoming smaller in size, each bearing that rotatably supports the corresponding gear also has to become smaller. Hence, such a smaller bearing cannot withstand driving force transmitted from the image forming device. Especially, the input gear is required to have an improved strength to stably transmit the driving force.

In view of the foregoing, it is an object of the present invention to provide a compact-sized process cartridge and a developing cartridge capable of stably transmitting driving force from an image forming device to a developing roller and a supply roller.

In order to attain the above and other objects, there is provided a cartridge that is detachably mountable on a main casing, the main casing being provided with a coupling member providing a driving force, the cartridge comprising: a first roller extending in a first direction and configured to rotate about a first rotational axis; a driving force receiving portion configured to receive the driving force from the coupling member to drive the first roller and rotate about a second rotational axis, the driving force receiving portion comprising a contact portion configured to be in contact with the coupling member; and a first gear comprising a gear tooth, the gear being configured to transmit the driving force received at the driving force receiving portion to the first roller. The contact portion is overlapped with the gear tooth when projected in the first direction.

BRIEF DESCRIPTION OF THE DRAWINGS

In the drawings:

FIG. 2A is a left-side view of the developing cartridge according to a first embodiment;

FIG. 2B is a left-side view of the developing cartridge shown in FIG. 2A with a gear cover thereof taken off;

FIG. 2C is a left-side view showing the developing cartridge of FIG. 2B with some gears removed therefrom;

DETAILED DESCRIPTION

A color printer 1 according to a first embodiment of the present invention will first be described with reference to FIGS. 1 through 11. In the following description, orientations will be referred to based on arrows shown in respective drawings. Also note that a left-to-right direction is identical to a widthwise direction.

1. Printer

Figure 1:
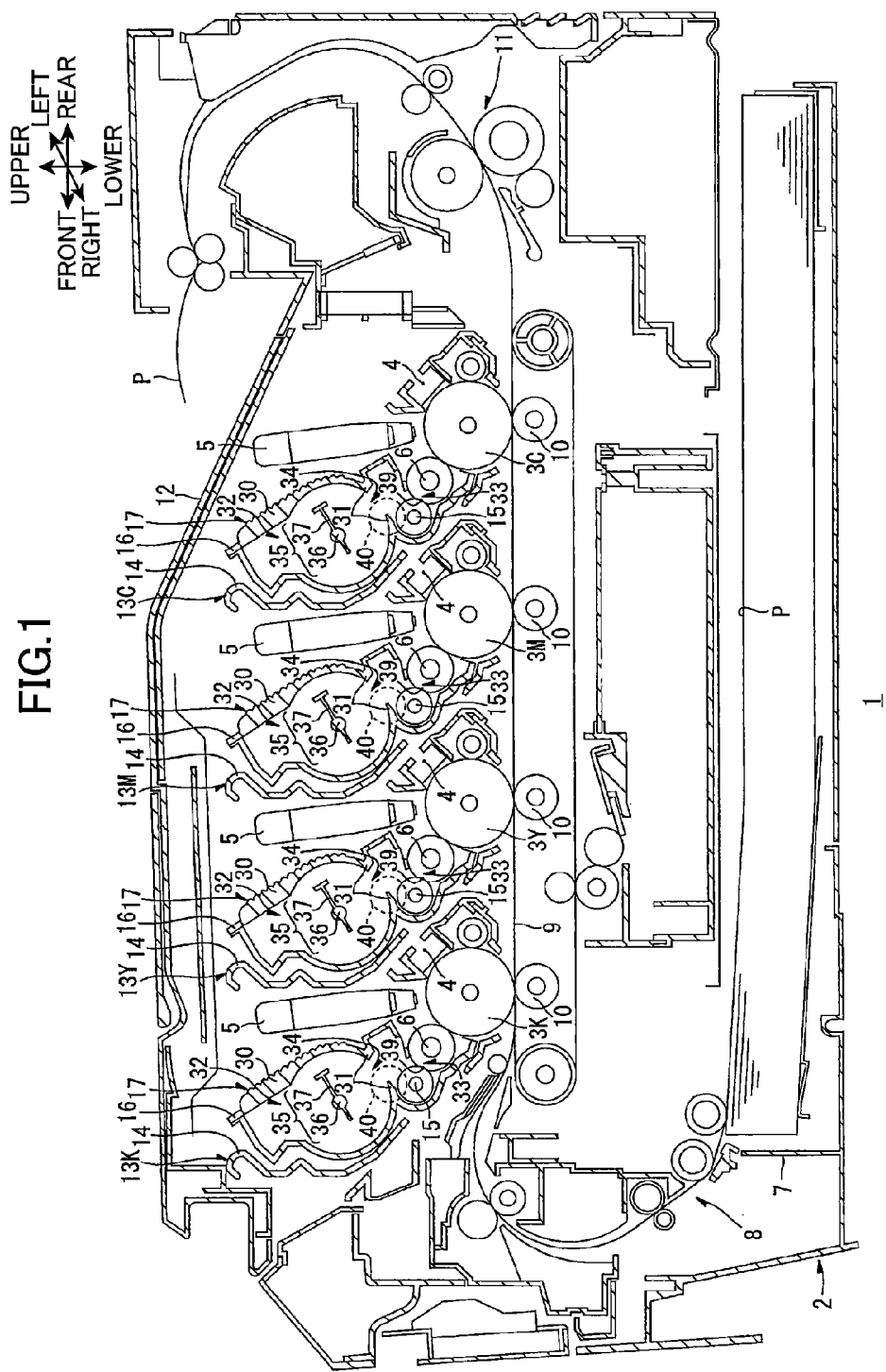
FIG. 1 is a cross-sectional view of a printer, with a developing cartridge mounted therein, according to a first embodiment of the present invention.

As shown in FIG. 1, the printer 1 includes a main casing 2 within which four process cartridges 13, a sheet cassette 7 that accommodates sheets P, a sheet feeding unit 8, a conveyor belt 9, four transfer rollers 10 and a fixing unit 11 are provided. A discharge tray 12 is formed on an upper surface of the main casing 2.

The four process cartridges 13 are detachably mounted in the main casing 2 and juxtaposed in a front-to-rear direction. The four process cartridges 13 respectively correspond to four colors of black, cyan, magenta and yellow. In accordance with four colors, the four process cartridges 13 will be referred to as process cartridges 13K, 13C, 13M, and 13Y respectively.

Each process cartridge 13 includes a process casing 14 within which a photosensitive drum 3, a Scorotron charger 4, an LED unit 5, a developing roller 6, a supply roller 15 and a toner hopper 16 are provided. Each of the Scorotron charger 4, the LED unit 5 and the developing roller 6 is disposed in opposition to the photosensitive drum 3. Just like the process cartridges 13, the photosensitive drums 3, which are also juxtaposed in the front-to-rear direction, will be referred to individually as a photosensitive drums 3K, 3C, 3M and 3Y in accordance with four colors of toner images formed on thereon.

In each process cartridge 13, the photosensitive drum 3, the developing roller 6 and the supply roller 15 are rotatably supported to the process casing 14. Each of the photosensitive drum 3, the developing roller 6 and the supply roller 15 has a rotational shaft extending in a widthwise direction. Toner accommodated in the toner hopper 16 is supplied to the developing roller 6 by the supply roller 15 and carried on the surface of the developing roller 6.

Each of the four transfer rollers 10 is disposed at a position opposing to each of the photosensitive drums 3 via the conveyor belt 9. That is, the conveyor belt 9 is disposed between each photosensitive drum 3 and each transfer roller 10 corresponding thereto.

Each surface of the photosensitive drums 3 is uniformly charged by corresponding Scorotron charger 4, and then exposed to light by LEDs (not shown) of the corresponding LED unit 5. In this way, an electrostatic latent image is formed on each surface of the photosensitive drums 3 according to image data. Subsequently, toner carried on respective developing rollers 6 is supplied to each electrostatic latent image, thereby forming a visible toner image on the surfaces of the respective photosensitive drums 3.

The sheet P is conveyed from the sheet cassette 7 to the conveyor belt 9 via the sheet feeding unit 8 including a plurality of rollers. In the process, the sheet P is guided in a direction first frontward but then rearward. The toner image formed on each photosensitive drum 3 is sequentially superimposed onto the sheet P with transfer bias applied to each of the transfer rollers 10 while the sheet P is conveyed on the conveyor belt 9. The sheet P is then conveyed to the fixing unit 11 whereby the toner image transferred on the sheet P is thermally fixed thereon. The sheet P is then conveyed while turning the direction thereof from rearward to frontward via a variety of rollers, and finally discharged onto the discharge tray 12.

2. Developing Cartridge

The developing roller 6, the supply roller 15 and the toner hopper 16 constitute a developing cartridge 17 as a unit. The developing cartridge 17 is detachably mounted on the process casing 14 as a photosensitive cartridge.

Hereinafter a detailed configuration of the developing cartridge 17 will be described with reference to FIGS. 1 to 11.

As shown in FIG. 1, the developing cartridge 17 includes a developing casing 30 as a frame main body. The developing casing 30 is formed in a box shape elongated with respect to the widthwise direction. When the developing cartridge 17 is mounted on the process casing 14, the developing casing 30 slopes diagonally upward and forward in a right side view.

A partitioning wall 31 is provided on the middle portion of the developing casing 30 with respect to the vertical direction. The partitioning wall 31 extends in the widthwise direction for partitioning the interior of the developing casing 30 into a first chamber 32 and a second chamber 33. The first chamber 32 is located above the second chamber 33. A through-hole 34 is formed in the partitioning wall 31 to allow communication between the first chamber 32 and the second chamber 33.

The first chamber 32 corresponds to the interior of the toner hopper 16 and accommodates toner therein. An agitator 35 is provided within the first chamber 32 for agitating the toner within the first chamber 32. The agitator 35 includes a rotational shaft 36 extending in the widthwise direction and a blade 37 provided on the rotational shaft 36. As the blade 37 pivotally moves about the rotational shaft 36, the toner accommodated in the first chamber 32 is agitated, thereby discharging the toner to the second chamber 33 through the through-hole 34.

The second chamber 33 accommodates the developing roller 6 and the supply roller 15. The supply roller 15 is disposed below and adjacent to the through-hole 34. The developing roller 6 is disposed rearward (more precisely, diagonally rearward and downward) of the supply roller 15. The developing roller 6 is in pressure contact with the supply roller 15 at a position diagonally upward and forward of the developing roller 6. A nip 39 is formed between the developing roller 6 and the supply roller 15. The developing roller 6 is in contact with the photosensitive drum 3 at a position diagonally downward and rearward of the developing roller 6 while the contact position is exposed from the developing casing 30. The toner discharged out of the first chamber 32 via the through-hole 34 is supplied from the supply roller 15 to the developing roller 6 via the nip 39, thereby visualizing the electrostatic latent image formed on the photosensitive drum 3.

As shown in FIG. 2A, the developing casing 30 has a left side surface which is covered by a gear cover 47. A window 38 is provided on the left side surface of the developing casing 30 at a position corresponding to the first chamber 32. On the gear cover 47 as well, a hole is formed at a position corresponding to the window 38. The window 38 enables a user to detect how much toner is left in the first chamber 32.

Under the gear cover 47, as shown in FIG. 2B, an input gear 40, a supply roller gear 41 (as a transmission gear), a first idle gear 42, a developing roller gear 43, a second idle gear 44, an agitator gear 45 and a detection gear 46 (as intermediary gears) are provided. Each of these gears is formed in a columnar shape having a rotational axis extending in the widthwise direction. Note that in FIGS. 2A to 2C, the developing cartridge 17 (the developing casing 30) is shown upright for the sake of explanatory purpose.

The input gear 40 is disposed at a position substantially center of the developing casing 30 with respect to the vertical direction. When the input gear 40 is projected onto the developing cartridge 17 in the widthwise direction, the input gear 40 is arranged to overlap with the partitioning wall 31 as shown in a dotted circle in FIG. 1. That is, the input gear 40 is linearly aligned with the portioning wall 31 in the widthwise direction. An input gear shaft 49 is provided on the left side surface of the developing casing 30 at a position coinciding with a center of the input gear 40. The input gear shaft 49 is a cylindrical boss protruding leftward from the left side surface of the developing casing 30. The input gear shaft 49 penetrates the center of the input gear 40, thereby rotatably supporting the input gear 40. That is, the input gear 40 can rotate about the input gear shaft 49 (See FIG. 11).

Figure 5:
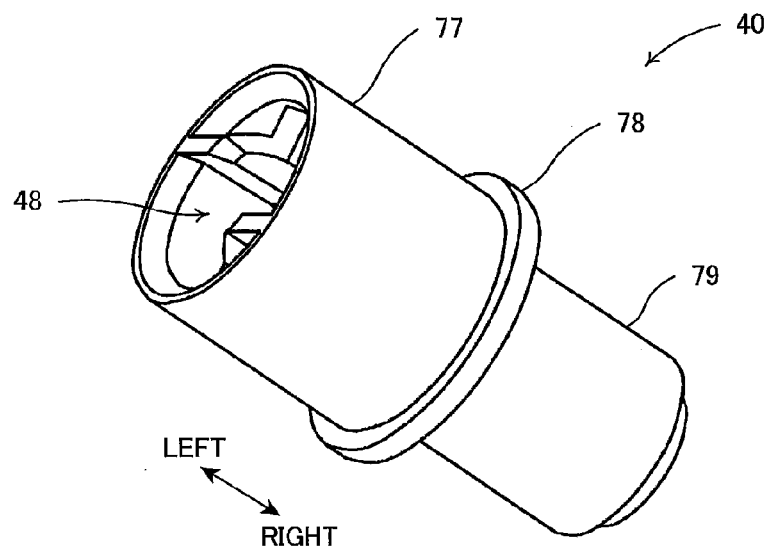
FIG. 5 is a perspective view of the input gear when viewed from downward left.

The input gear 40 has a connecting portion 77 and a gear portion 79 formed adjacent to the connecting portion 77 and a flange portion 78 partitioning the connecting portion 77 and the gear portion 79 (See FIG. 5). The input gear 40 has a left end surface formed with a depressed portion 48. The depressed portion 48 is exposed leftward from the gear cover 47, as shown in FIG. 2A. Detailed configuration of the input gear 40 will be described later.

The supply roller gear 41 includes a gear main body 41A formed in a disk shape whose circumferential surface is formed with gear teeth. The supply roller gear 41 is rotatable about a rotational axis that is a center of the gear main body 41A. The gear main body 41A has an outer surface 41B facing leftward. The supply roller gear 41 is disposed downward (more precisely, diagonally downward and forward) of the input gear 40. The supply roller gear 41 has a front end portion exposed from the gear cover 47 but the supply roller gear 41 is almost covered with the gear cover 47 from leftward except the front end portion, as shown in FIG. 2A. The gear teeth of the supply roller gear 41 are meshingly engaged with the gear portion 79 of the input gear 40 at a position upward of the supply roller gear 41 (i.e., downward of the input gear 40).

The left end of the rotational shaft of the supply roller 15 protrudes from the left side surface of the developing casing 30 at a position coinciding with the center of the supply roller gear 41, as shown in FIG. 2C. The rotational shaft of the supply roller 15 penetrates the center of the supply roller gear 41, thereby supporting the supply roller gear 41. The left end of the rotational shaft of the supply roller 15 has a substantially D-shaped cross section, while the center of the supply roller gear 41 through which the left end of the rotational shaft of the supply roller 15 penetrates is formed with a substantially D-shaped through-hole. In this way, the supply roller gear 41 and the supply roller 15 integrally rotate about the axis of the rotational shaft of the supply roller 15.

The first idle gear 42 has gear teeth on the circumferential surface thereof. The first idle gear 42 is disposed rearward of the supply roller gear 41. The first idle gear 42 exposes a bottom end portion thereof from the gear cover 47, but the first idle gear 42 as a whole is almost covered with the gear cover 47 as shown in FIG. 2A. The gear teeth of the first idle gear 42 are meshingly engaged with the gear teeth of the supply roller gear 41 at a position forward of the first idle gear 42 (i.e., rearward of the supply roller gear 41).

A first idle gear shaft 50 protrudes from the left side surface of the developing casing 30 at a position coinciding with a center of the first idle gear 42, as shown in FIG. 2C. The first idle gear shaft 50 is a cylindrical boss protruding leftward from the left side surface of the developing casing 30. The first idle gear shaft 50 penetrates the center of the first idle gear 42 and thus rotatably supports the first idle gear 42. That is, the first idle gear 42 can rotate about the first idle gear shaft 50.

As to the supply roller 15, a bearing 55 is provided on the left side surface of the developing casing 30, as shown in FIG. 2C. The bearing 55 is formed in a substantially rectangular plate shape when viewed from leftward. The bearing 55 is formed with a through-hole 56 at a position substantially center of the bearing 55. The left end of the rotational shaft of the supply roller 15 penetrates the through-hole 56. In this way, the bearing 55 rotatably supports the supply roller 15 about the axis of the rotational shaft of the supply roller 15.

A claw 57 is formed on the left side surface of the developing casing 30. As show in FIG. 2C, the claw 57 engages the bearing 55 so that the bearing 55 can be fixed to the left side surface of the developing casing 30. The bearing 55 is further formed with two recesses 58. One of the recesses 58 is formed at a corner of the bearing 55 located diagonally upward of the through-hole 56, whereby the input gear shaft 49 is in contact with the bearing 55 at a deepest position in the recess 58. Another recess 58 is formed at a corner of the bearing 55 located rearward of the through-hole 56, whereby the first idle gear shaft 50 is in contact with the bearing 55 at a deepest position in this recess 58. Hereinafter, whenever necessary, the input gear shaft 49 and the first idle gear shaft 50 are collectively referred to as a contingence portion 59.

The developing roller gear 43 has gear teeth on the circumferential surface thereof. The developing roller gear 43 is disposed downward of the first idle gear 42 and is exposed leftward from the gear cover 47 at a bottom portion thereof, as shown in FIG. 2A. As shown in FIG. 2B, the gear teeth of the developing roller gear 43 are meshingly engaged with the gear teeth of the first idle gear 42 at a position upward of the developing roller gear 43 (i.e., downward of the first idle gear 42).

The left end of the rotational shaft of the developing roller 6 is exposed from the left side surface of the developing casing 30 at a position coinciding with a center of the developing roller gear 43. The left end of the rotational shaft of the developing roller 6 penetrates the center of the developing roller gear 43 for supporting the developing roller gear 43. Note that, the developing roller gear 43 is configured not to rotate relative to the left end of the rotational shaft of the developing roller 6. In other words, the developing roller 6 and the developing roller gear 43 are configured to able to rotate in conjunction with each other about the axis of the rotational shaft of the developing roller 6.

The second idle gear 44 has a right portion (closer to the left side surface of the developing casing 30) and a left portion with respect to the widthwise direction. The right portion has a diameter smaller than that of the left portion, but each portion is formed with gear teeth on the circumferential surface thereof. The second idle gear 44 is disposed diagonally rearward and upward of the input gear 40 and is covered with the gear cover 47 from leftward, as shown in FIG. 2A. The gear teeth of the second idle gear 44 are meshingly engaged with the gear portion 79 of the input gear 40 at a position forward of the second idle gear 44 (i.e., rearward of the input gear 40).

A second idle gear shaft 51 is provided on the left side surface of the developing casing 30 at a position coinciding with a center of the second idle gear 44, as shown in FIG. 2C. The second idle gear shaft 51 is a cylindrical boss protruding leftward from the left side surface of the developing casing 30. The second idle gear shaft 51 penetrates the center of the second idle gear 44, thereby rotatably supporting the second idle gear 44. In this way, the second idle gear 44 can be made to rotate about the second idle gear shaft 51.

The agitator gear 45 is formed with gear teeth on the circumferential surface thereof. The agitator gear 45 is disposed diagonally upward and forward of the second idle gear 44 and covered with the gear cover 47 from leftward, as shown in FIG. 2A. The gear teeth of the agitator gear 45 are meshingly engaged with the gear teeth of the second idle gear 44 at a position downward of the agitator gear 45 (i.e., upward of the second idle gear 44).

The left end of the rotational shaft 36 of the agitator 35 is exposed from the left side surface of the developing casing 30 at a position coinciding with a center of the agitator gear 45 (see FIG. 2C). The left end of the rotational shaft 36 of the agitator 35 penetrates the center of the agitator gear 45, thereby supporting the agitator gear 45. The left end of the rotational shaft 36 of the agitator 35 has a substantially D-shaped cross section, while the center of the agitator gear 45 is also formed with a substantially D-shaped through-hole. In this way, the agitator gear 45 and the rotational shaft 36 of the agitator 35 integrally rotate about the axis of the rotational shaft 36. Note that the left end of the rotational shaft 36 of the agitator 35 is exposed leftward from the gear cover 47, as shown in FIG. 2A.

The detection gear 46 is partially formed with gear teeth on the right circumferential surface thereof. The detection gear 46 is disposed upward of the agitator gear 45. A detection gear shaft 52 is provided on the left side surface of the developing casing 30 at a position coinciding with a center of the detection gear 46, as shown in FIG. 2C. The detection gear shaft 52 is a cylindrical boss protruding leftward from the left side surface of the developing casing 30. The detection gear shaft 52 penetrates the center of the detection gear 46, thereby supporting the detection gear 46. That is, the detection gear 46 is rotatably supported to the left side surface of the developing casing 30 about the detection gear shaft 52.

When the developing cartridge 17 is mounted on the process casing 14 for the first time, the partial gear teeth of the detection gear 46 are meshingly engaged with the gear teeth of the agitator gear 45 at a position upward of the agitator gear 45. The left end surface of the detection gear 46 is provided with a plurality of protrusions 53 protruding leftward, as shown in FIG. 2B. The protrusions 53 are arranged along the periphery of the left end surface of the detection gear 46. The locations of the developing cartridge 17 are corresponds to information on the developing cartridge 17. More specifically, the locations of the protrusions 53 corresponds to information indicating whether or not the developing cartridge 17 is new and indicating how many more pages can be printed with the developing cartridge 17.

As also shown in FIG. 2A, the gear cover 47 is formed with an opening 54 for exposing the protrusions 53. When the detection gear 46 rotates, the protrusions 53 are exposed leftward from the gear cover 47 through the opening 54.

Figure 9:
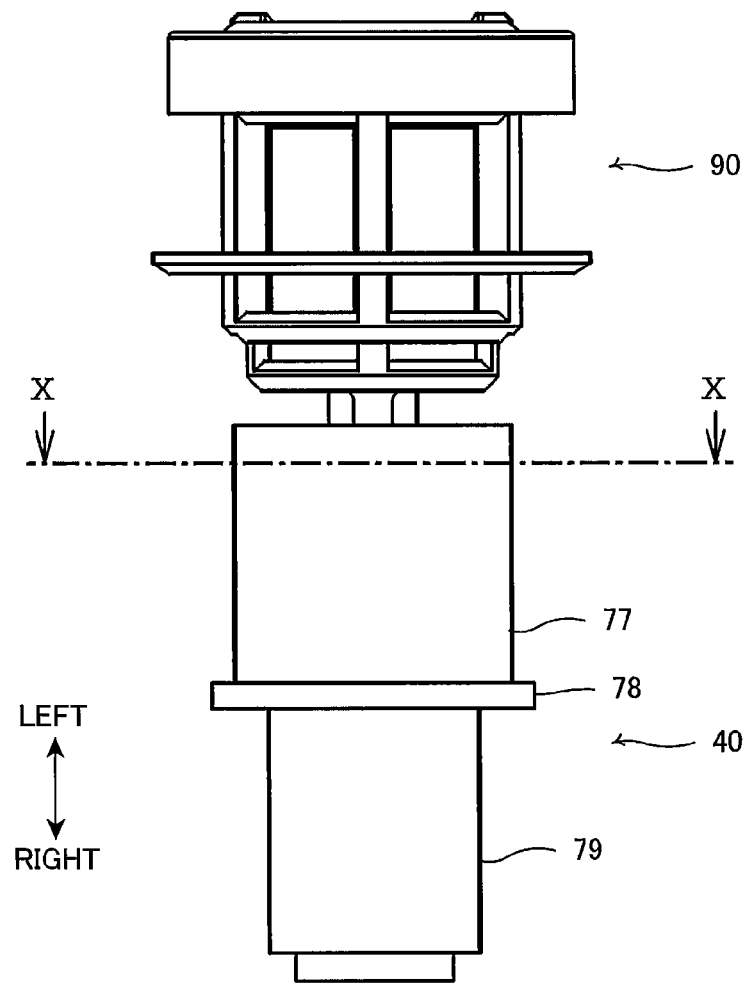
FIG. 9 is a plan view illustrating a state where the input gear is connected to a coupling member provided in a main casing of the printer.
Figure 10:
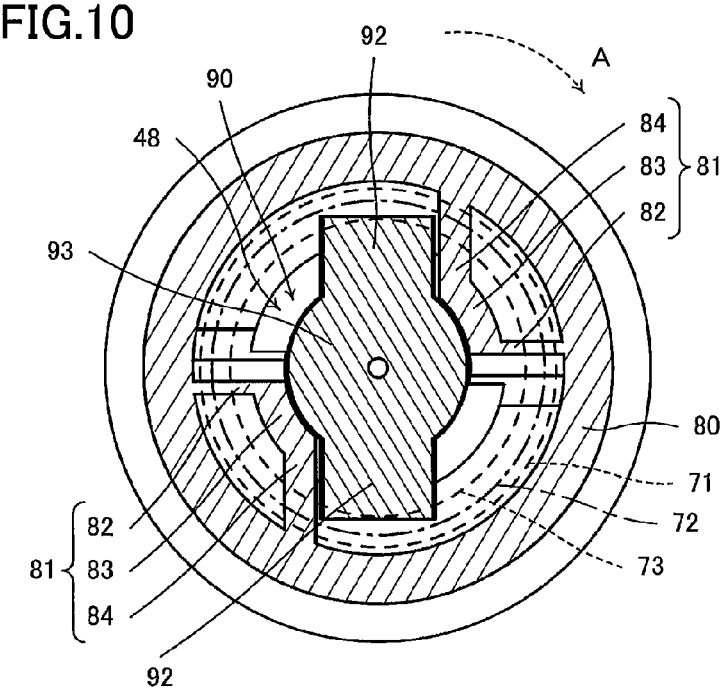
FIG. 10 is a cross-sectional view of the input gear taken along a line X-X shown in FIG. 9 in which the input gear is coupled to the coupling member.

When the developing cartridge 17 is mounted in the process casing 14 as shown in FIG. 1, the depressed portion 48 of the input gear 40 is coupled to a coupling member 90 provided on the main casing 2 (to be described later with reference to FIG. 9).

The coupling member 90 is connected to an output shaft of a motor (not shown) disposed within the main casing 2. Hence, when the motor is driven and thus the coupling member 90 starts rotating, driving force from the motor is transmitted from the coupling member 90 (i.e., outside of the developing cartridge 17) to the input gear 40 via the depressed portion 48 coupled to the coupling member 90. Upon receipt of the driving force, the input gear 40 starts rotating in a direction indicated by a dotted arrow A (i.e., in a clockwise direction) in FIGS. 2B and 3.

The driving force received at the input gear 40 is then transmitted to the supply roller gear 41 and the second idle gear 44 each of which are in engagement with the input gear 40 meshingly. Accordingly, the supply roller gear 41 starts rotating in a direction indicated by a dotted arrow B (i.e., in a counterclockwise direction) in FIGS. 2B and 3. In accordance with the rotation of the supply roller gear 41, the supply roller 15 is made to rotate in the direction B the same as the supply roller gear 41. In other words, the supply roller gear 41 drives the supply roller 15 to rotate.

At this time, each gear surface of the input gear 40 presses each gear surface of the supply roller gear 41 at the position where the input gear 40 and the supply roller gear 41 are meshingly engaged with each other. This pressing force of the gear surfaces of the input gear 40 against the gear surfaces of the supply roller gear 41 will be illustrated in a heavy arrow X in FIGS. 2B and 3. The pressing force X works in a direction substantially parallel to the direction B as well as rearward at the engaging position of the input gear 40 and the supply roller gear 41.

The second idle gear 44, on the other hand, is also made to rotate in a direction indicated by a dotted arrow C (i.e., in the counterclockwise direction) in FIG. 2B, in accordance with the rotation of the input gear 40 in the direction A.

As the supply roller gear 41 rotates, the driving force is further transmitted to the first idle gear 42 which is meshingly engaged with the supply roller gear 41. Accordingly, the first idle gear 42 starts rotating in a direction indicated by a dotted arrow D (i.e., in the clockwise direction) in FIGS. 2B and 3. At this time, each gear surface of the supply roller gear 41 presses each gear surface of the first idle gear 42 at the position where the supply roller gear 41 and the first idle gear 42 are meshingly engaged with each other. At this engaging position, reaction force of the first idle gear 42 acts against the pressing force of the supply roller gear 41. In other words, the gear surfaces of the first idle gear 42 presses the gear surfaces of the supply roller gear 41 at this engaged position. This pressing force of the first idle gear 42 is illustrated in a heavy arrow Y in FIGS. 2A and 3. The pressing force Y works in a direction substantially opposite to the direction D as well as upward at the engaged position of the first idle gear 42 and the supply roller gear 41.

Figure 3:
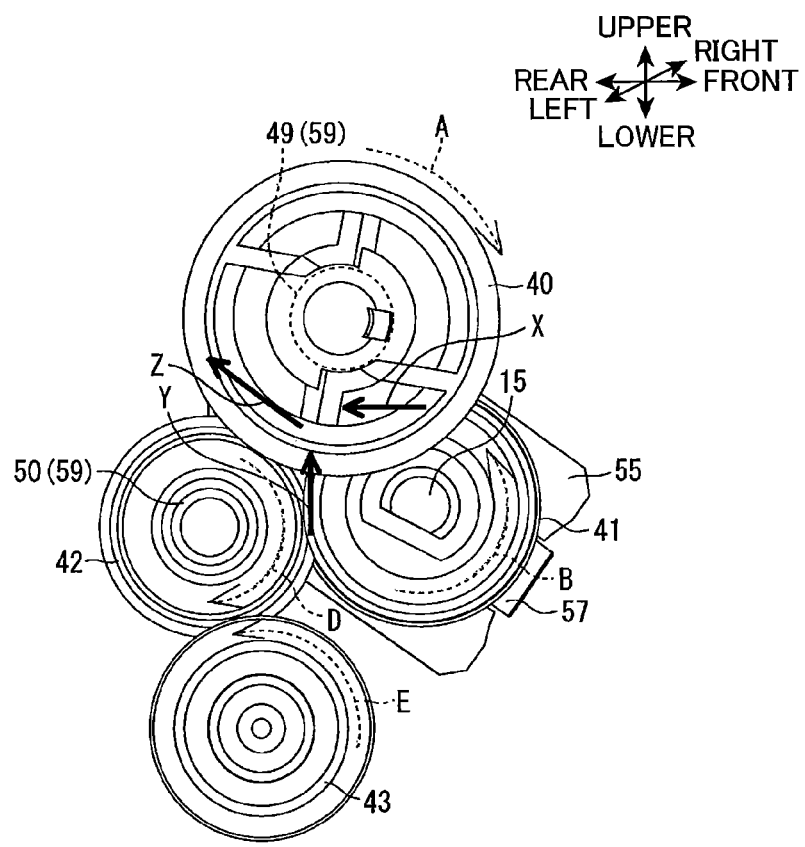
FIG. 3 is an enlarged view illustrating gears (an input gear, a supply roller gear, a first idle gear and a developing roller gear) and surroundings thereof provided in the developing cartridge shown in FIG. 2B.

As a result of combination of the pressing force X and the pressing force Y, resultant force Z is generated and acts in a direction diagonally upward and rearward between the input gear shaft 49 and the first idle gear shaft 50, which is shown by a heavy arrow Z in FIGS. 2B, 2C and 3. This resultant force Z acts on the supply roller gear 41, the left end of the rotational shaft of the supply roller 15 that supports the supply roller gear 41, and the bearing 55 that supports the left end of the rotational shaft of the supply roller 15. The contingence portion 59 (the input gear shaft 49 and the first idle gear shaft 50) contacts the bearing 55 from downstream in the working direction of the resultant force Z within the corresponding recesses 58, as shown in FIG. 2C.

Since the first idle gear 42 is meshingly engaged with each of the supply roller gear 41 and the developing roller gear 43, the driving force from the supply roller gear 41 is transmitted to the developing roller gear 43 via the first idle gear 42. Hence, the developing roller gear 43 is made to rotate in a direction indicated by a dotted arrow E (i.e., counterclockwise) in FIGS. 2B and 3. The developing roller 6 is therefore to rotate in conjunction with the rotation of the developing roller gear 43 in the direction E. That is, the developing roller gear 43 drives the developing roller 6 to rotate.

In accordance with the rotation of the second idle gear 44 upon receipt of the driving force from the input gear 40, the agitator gear 45, which is in engagement with the second idle gear 44 meshingly, is made to rotate in response to the driving force transmitted thereto from the second idle gear 44. The agitator gear 45 rotates in a direction indicated by a dotted arrow F (i.e., clockwise) shown in FIG. 2B. As a result, the agitator 35 is to rotate in conjunction with the rotation of the agitator gear 45 in the direction F.

In accordance with the rotation of the agitator gear 45, the detection gear 46 is then made to rotate upon receipt of the driving force transmitted from the agitator gear 45. The detection gear 46 rotates in a direction indicated by a dotted arrow G (i.e., counterclockwise) shown in FIG. 2B.

3. Configuration of Input Gear

Next, a configuration of the input gear 40 will be described in more details with reference to FIGS. 4 through 11.

As shown in FIG. 5, the input gear 40 includes the connecting portion 77 and the gear portion 79 arranged adjacent to the connecting portion 77 along the rotational axis of the input gear 40 (i.e., widthwise direction of the printer 1). The input gear 40 also includes the flange portion 78 that partitions the connecting portion 77 and the gear portion 79. The connecting portion 77 has a dimension (diameter) greater than that of the gear portion 79 in a direction perpendicular to the rotational axis of the input gear 40. The input gear 40 is formed of a resin (more precisely, a polyacetal resin).

Figure 6:
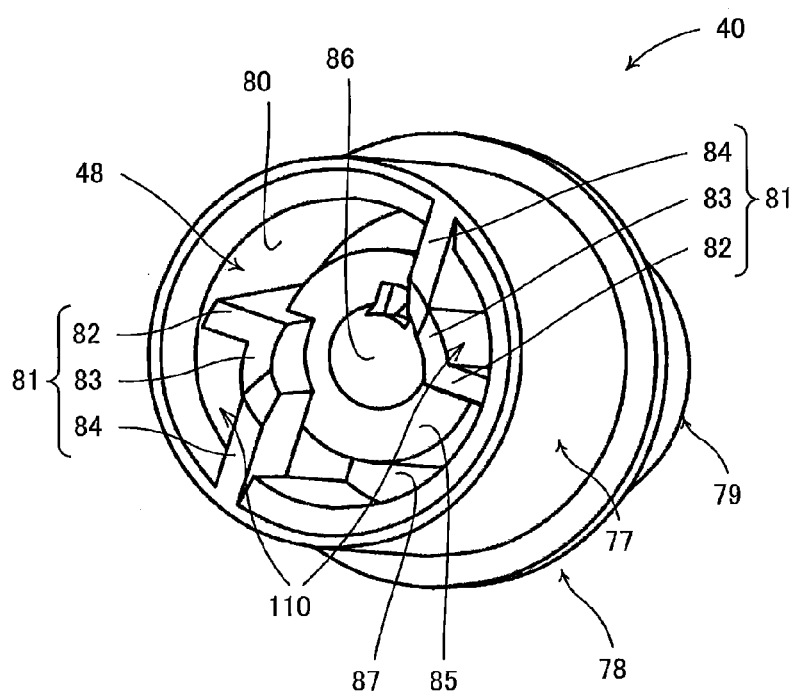
FIG. 6 is a perspective view of the input gear when viewed from frontward left.
Figure 7:
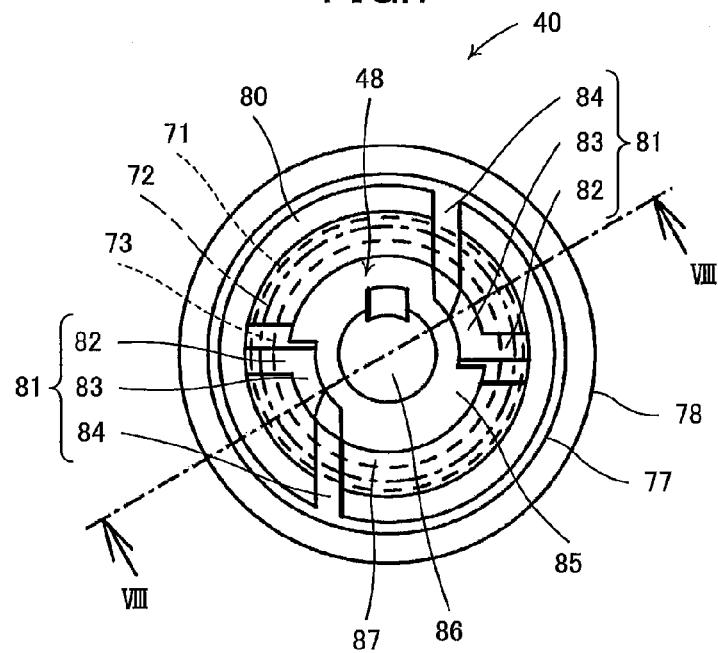
FIG. 7 is a left-side view of the input gear.

The connecting portion 77 is formed in a cylindrical shape whose center corresponds to the rotational axis of the input gear 40. The connecting portion 77 includes an outer circumferential wall 80 and a pair of engaging sections 81 protruding inward from the outer circumferential wall 80, as shown in FIGS. 6 and 7. The outer circumferential wall 80 has a cylindrical shape and includes a cylindrical-shaped inner surface whose center is the rotational axis of the input gear 40. That is, the outer circumferential wall 80 extends along the whole circumference of the input gear 40. The outer circumferential wall 80 is supported by an inner surface of a protrusion 100 of the gear cover 47 (described later) when the input gear 40 rotates.

The engaging sections 81 are symmetrically positioned with respect to the rotational axis of the input gear 40, as shown in FIGS. 6 and 7. The engaging sections 81 serve as a contact portion. Each engaging section 81 includes a first wall 82, an inner circumferential wall 83 and a second wall 84. The first wall 82 is formed in a linear shape extending from the outer circumferential wall 80 toward the rotational axis of the input gear 40. The inner circumferential wall 83 is formed to extend from an inner end of the first wall 82, in a circumferential direction of the input gear 4 about the rotational axis thereof. That is, the inner circumferential wall 83 is concentric with the cylindrical-shaped inner surface of the outer circumferential wall 80. The second wall 84 is formed in a linear shape extending from another end of the inner circumferential wall 83 toward the outer circumferential wall 80. The second wall 84 is to be in contact with the coupling member 90 provided in the main casing 2 as will be described later (See FIG. 10). The first wall 82, the inner circumferential wall 83, the second wall 84 and the outer circumferential wall 80 are formed integrally. The outer circumferential wall 80 serves to reinforce the engaging sections 81 (more specifically, the second walls 84) that contact the coupling member 90 as the contact portion (a point of action).

Figure 8:
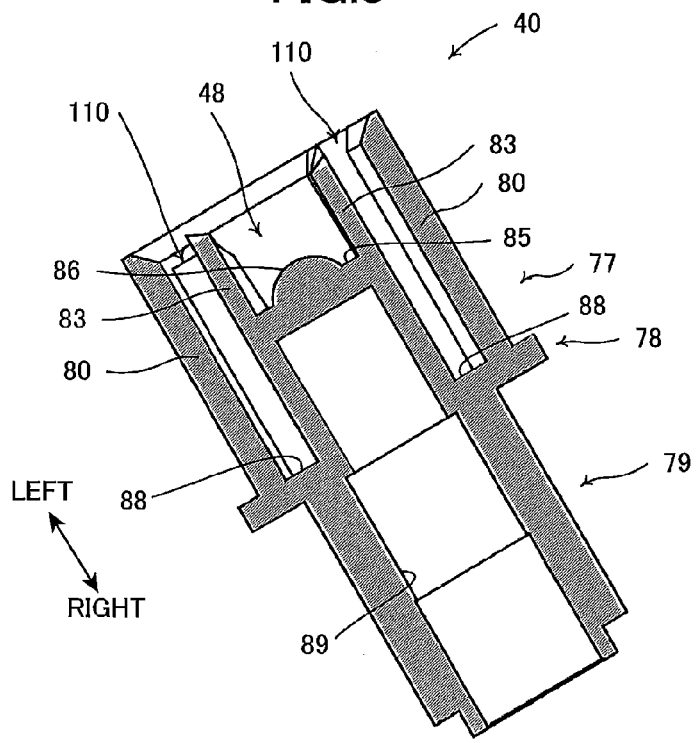
FIG. 8 is a cross-sectional view of the input gear taken along a line VIII-VIII shown in FIG. 7.

The connecting portion 77 is further formed with a first bottom wall 87, a platform 85 and a projection 86 as also shown in FIGS. 6 through 8. The first bottom wall 87 is formed as a portion of the flange portion 78 inside the input gear 40. The platform 85 is formed in a cylindrical shape having the rotational axis of the input gear 40 as a center thereof, protruding outward from the first bottom wall 87 in the axial direction of the input gear 40. The projection 86 is formed in a domical shape and disposed at the center of the platform 85. The projection 86 is to contact the coupling member 90 of the main casing 2 in the axial direction of the input gear 40 when the coupling member 90 is inserted into the connecting portion 77, thereby serving to position the input gear 40 relative to the coupling member 90 with respect to the axial direction of the input gear 40. The outer circumferential wall 80, the first walls 82, the inner circumferential walls 83, the second walls 84, the first bottom wall 87, the platform 85 and the projection 86 constitute the depressed portion 48 exposed leftward from the gear cover 47 in the widthwise direction.

A gap 110 facing outward is formed within each engaging section 81. That is, the gap 110 is bounded on the periphery by the first wall 82, the inner circumferential wall 83, the second wall 84 and the outer circumferential wall 80, as shown in FIG. 6. Within the gap 110, a second bottom wall 88 is formed inside the input gear 40 in the axial direction of the input gear 40 as a portion of the flange portion 78, just like the first bottom wall 87. In other words, the gap 110 is closed with the second bottom wall 88 at a side adjacent to the flange portion 78 with respect to the axial direction of the input gear 40, as shown in FIG. 8. When the connecting portion 77 is projected toward the gear portion 79, a pitch circle 72 of the gear portion 79 (described later) comes to a position overlapping with the second bottom wall 88. Details of the pitch circle 72 will be described later.

The input gear 40 is formed of a resin, as stated earlier. Hence, the first wall 82, the inner circumferential wall 83, the second wall 84 and the outer circumferential wall 80 are required to be formed in a thickness as uniform as possible. To this effect, when molding the input gear 40, the first wall 82, the inner circumferential wall 83, the second wall 84 and the outer circumferential wall 80 can be made in the uniform thickness by inserting a die into the input gear 40 at a position corresponding to their center in the axial direction of the input gear 40. Since the gear portion 79 is provided at a position coinciding with the second bottom wall 88 in the axial direction of the input gear 40, the die cannot be removed from the gear portion 79 side. The gap 110 facing outward along the axial direction of the input gear 40 therefore serves to release the die from the input gear 40 from a side opposite to the gear portion 79 side.

The gear portion 79 is formed integrally with the connecting portion 77 via the flange portion 78. The gear portion 79 has a diameter smaller than that of the connecting portion 77, as shown in FIGS. 5 and 8. The gear portion 79 includes a supported wall 89 of a cylindrical shape. The supported wall 89 is formed with gear teeth on the outer circumferential surface thereof. The supported wall 89 has an inner surface formed in a stepped manner.

The flange portion 78 protrudes outward from an end of the connecting portion 77 located at the gear portion 79 side in a direction perpendicular to the axial direction of the input gear 40, as shown in FIG. 8. The flange portion 78 is in contact with the gear cover 47 so as to position the input gear 40 with respect to the axial direction thereof, as will be described later.

Figure 4:
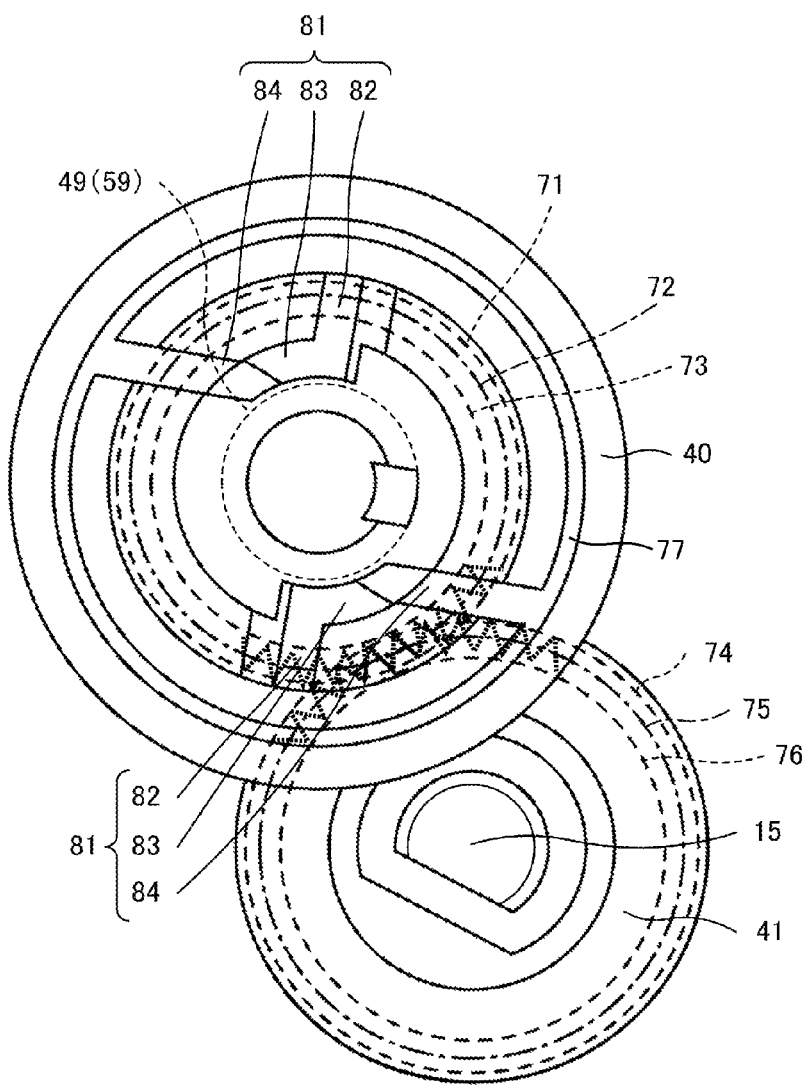
FIG. 4 is a left-side view conceptually illustrating a state where the input gear is meshingly engaged with the supply roller gear.

As shown in FIG. 4, the gear portion 79 of the input gear 40 includes an addendum circle 71, the pitch circle 72, and a dedendum circle 73. The addendum circle 71 is an imaginary circle formed by connecting tops of each of the gear teeth constituting the gear portion 79. The pitch circle 72 is an imaginary circle formed by connecting pitch points where each gear tooth of the gear portion 79 and each gear tooth of the supply roller gear 41 are in contact with each other. The dedendum circle 73 is an imaginary circle formed by connecting dedendums of each gear tooth of the gear portion 79.

Likewise, the supply roller gear 41 which is meshingly engaged with the input gear 40 includes an addendum circle 74, a pitch circle 75, and a dedendum circle 76, as also shown in FIG. 4. The addendum circle 74 is an imaginary circle formed by connecting tops of each gear tooth of the supply roller gear 41. The pitch circle 75 is an imaginary circle formed by connecting pitch points where each gear tooth of the supply roller gear 41 and each gear tooth of the gear portion 79 are in contact with each other. The dedendum circle 76 is an imaginary circle formed by connecting roots of each gear tooth of the supply roller gear 41.

The input gear 40 is formed such that, when the connecting portion 77 is projected onto the gear portion 79 in the axial direction of the input gear 40, each engaging section 81 is located at a position overlapping with the pitch circle 72. That is, the engaging sections 81 are linearly aligned with the pitch circle 72 in the axial direction of the input gear 40. More specifically, the second wall 84 of one of the engaging sections 81, which contacts the coupling member 90 of the main casing 2, is located on the pitch circle 72 of the gear portion 79 in a plane to which the connecting portion 77 is projected. With this configuration, each engaging section 81 can be located at least on the pitch circle 72 in the projected plane, thereby stably transmitting the driving force to the gear portion 79 while making the gear portion 79 compact.

When the developing roller 6 is made to rotate, the coupling member 90 of the main casing 2 is inserted into the depressed portion 48 of the input gear 40, as shown in FIGS.

9 and 10. The coupling member 90 is retractably provided on the main casing 2 with respect to the axial direction of the input gear 40. Upon receipt of the driving force from the motor (not shown) disposed within the main casing 2, the coupling member 90 rotates in a clockwise direction in FIG. 10. At this time, the coupling member 90 contacts each of the second wall 84 of the input gear 40. This configuration prevents the input gear 40 from being distorted under strain, thereby further contributing to stable transmission of the driving force.

More specifically, the coupling member 90 has a tip portion on which a shaft 93 and a pair of protruding portions 92 are formed. The coupling member 90 rotates about the shaft 93 and the protruding portions 92 protrude from the shaft 93 in directions radially opposite to each other. The protruding portions 92 contact the second walls 84 respectively, thereby rotating the input gear 40 in the direction indicated by the dotted arrow A in FIG. 10. In accordance with the rotation of the input gear 40 in the direction A, the developing roller gear 43 is made to rotate via the supply roller gear 41 and the first idle gear 42, while the agitator gear 45 is made to rotate via the second idle gear 44.

Figure 11:
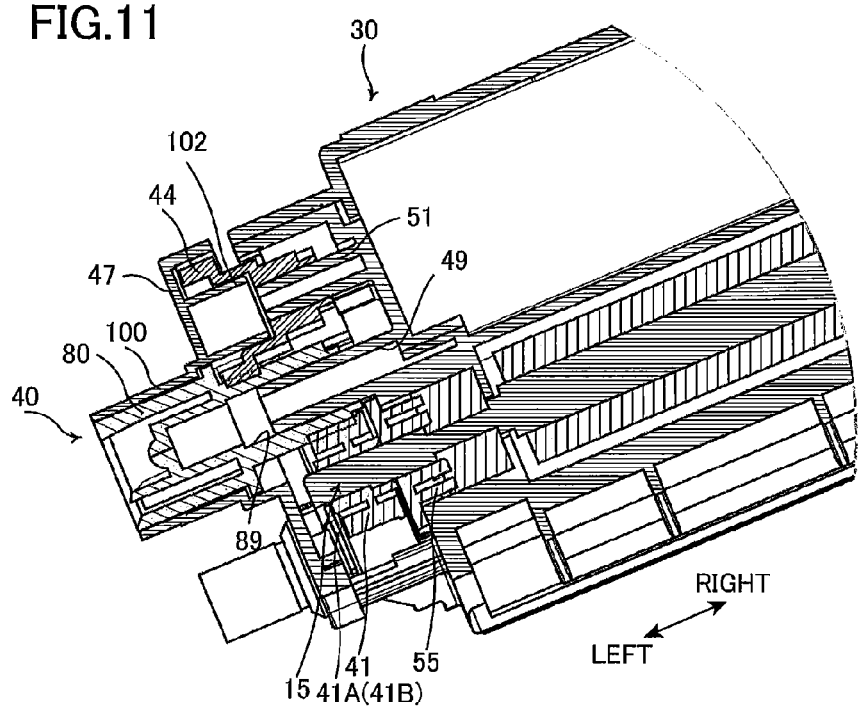
FIG. 11 is a cross-sectional view of the developing cartridge taken along a line XI-XI shown in FIG. 2A.

As shown in FIG. 11, the left end of developing casing 30 is provided with the second idle gear shaft 51, the input gear shaft 49 and the bearing 55. The second idle gear shaft 51 and the input gear shaft 49 protrude outward from the left end surface of the developing casing 30 in a direction parallel to the rotational shaft of the supply roller 15. As previously described, the second idle gear shaft 51 rotatably supports the second idle gear 44. The input gear shaft 49 as a bearing boss is inserted into the supported wall 89 of the input gear 40, thereby rotatably supporting the input gear 40. The rotational shaft of the supply roller 15 penetrates the bearing 55, while the supply roller gear 41 is fixed to the rotational shaft of the supply roller 15.

The left end of the input gear shaft 49 protrudes leftward than the outer surface 41B of the supply roller gear 41, as shown in FIG. 11. As previously stated, the input gear 40 is in meshing engagement with each of the second idle gear 44 and the supply roller gear 41. With this configuration, the rotational center of the input gear 40 can be accurately positioned at least at the position where the supply roller gear 41 and the input gear 40 are meshingly engaged with each other. The input gear 40, the second idle gear shaft 51 and the supply roller gear 41 are covered with the gear cover 47 from leftward, i.e., from a side opposite to the developing casing 30.

The gear cover 47 is formed with protrusions 100 and 102. The protrusion 100 protrudes outward (leftward) and the protrusion 102 protrudes inward (rightward) with respect to the direction parallel to the rotational shaft of the supply roller 15, as shown in FIG. 11. The protrusion 102 has a cylindrical shape and rotatably supports the second idle gear 44 from a side opposite to the second idle gear shaft 51. The protrusion 100 is also formed in a cylindrical shape having a free end which is open toward outward (leftward). The protrusion 100 has an inner surface which is coupled to the outer circumferential wall 80 of the input gear 40, thereby rotatably supporting the input gear 40 from a side opposite to the input gear shaft 49.

In the present embodiment, the developing cartridge 30 is made compact in size. Therefore, the gear portion 79 of the input gear 40 is thinned down, resulting in the input gear shaft 49 being slim. Hence, in accordance with the slimmed-down input gear shaft 49, the input gear 40 is supported with the protrusion 100 of the gear cover 47 from radially outward. In this way, the input gear 40 is accurately positioned relative to the developing casing 30 in cooperation with the input gear shaft 49 and the protrusion 100 of the gear cover 47.

That is, the input gear 40 is supported not only by the input gear shaft 49 but also by the protrusion 100 of the gear cover 47 provided from the side opposite to the developing casing 30. Hence, even though the input gear 40 is made compact, the input gear shaft 49 can, which is also made smaller in size in accordance with the compact-sized input gear 40, stably support the input gear 40 in collaboration with the protrusion 100 of the gear cover 47.

Further, the connecting portion 77 has a dimension greater than that of the gear portion 79 with respect to the direction orthogonal to the axial direction of the input gear 40 in the present embodiment. Hence, the overall dimension of the input gear 40 can be made smaller because of the smaller gear portion 79, while at the same time the input gear 40 can stably receive the driving force from the motor of the image forming device.

Further, the outer circumferential wall 80 is so provided as to extend along the whole circumference of the input gear 40, thereby stably supporting the input gear 40 in conjunction with the protrusion 100 that contacts the outer circumferential wall 80.

While the invention has been described in detail with reference to the specific embodiment thereof, it would be apparent to those skilled in the art that various changes and modifications may be made therein without departing from the spirit of the invention.

For example, although the process casing 14 and the developing cartridge 17 are configured to be detachably mounted in the main casing 2 integrally as the process cartridge 13 in the above-described embodiment, the developing cartridge 17 alone, separate from the process casing 14, may be detachably mounted in the main casing 2 on which the separated process casing 14 has already been mounted.

Further, while a direct-transfer method is employed in the color printer 1 according to the above embodiment, the present invention may also be applicable to a color or monochrome printer of an intermediate-transfer type.

Further, instead of exposing surfaces of the photosensitive drums 3 by LEDs, a laser may be used for exposing the same.

Further, while the outer circumferential wall 80 has a cylindrical shape in the above embodiment, an outer wall may have at least a curved surface whose center of radius of a curvature is coincident with the rotational axis of the input gear 40.

What is claimed is:

1. A cartridge that is detachably mountable on a main casing, the main casing being provided with a coupling member providing a driving force, the cartridge comprising:
   a first roller extending in a first direction, comprising a first shaft, and configured to rotate about a first rotational axis;
   a driving force receiving portion configured to receive the driving force from the coupling member to drive the first roller and rotate about a second rotational axis, the driving force receiving portion comprising a contact portion configured to be in contact with the coupling member;
   a first gear comprising a gear tooth, the gear being configured to transmit the driving force received at the driving force receiving portion to the first roller;
   a second roller extending in the first direction and being contact with the first roller, the second roller comprising a second shaft; and
   a second gear provided on the second shaft, the second gear being configured not to rotate with respect to the first shaft, wherein the contact portion is overlapped with the gear tooth when projected in the first direction.

2. The cartridge according to claim 1, wherein the driving force receiving portion is configured to contact with the coupling member when the cartridge is mounted on the main casing and the coupling member moves in the first direction.

3. The cartridge according to claim 1, wherein the driving force receiving portion comprises a cylindrical shape having an axis extending in the first direction.

4. The cartridge according to claim 3, wherein the driving force receiving portion further comprises a base portion extending in a radial direction perpendicular to the first direction, and the contact portion extends from the base portion in the first direction.

5. The cartridge according to claim 4, wherein the driving force receiving portion comprises a projection extending from the base portion in the first direction and positioned inside of the contact portion in the radial direction.

6. The cartridge according to claim 4, wherein the driving force receiving portion comprises an outer circumferential wall extending from the base portion and positioned outside of the contact portion in the radial direction.

7. The cartridge according to claim 1, wherein the driving force receiving portion comprises a first driving force receiving portion and a second driving force receiving portion positioned at a distance from the first driving force receiving portion in a rotating direction of the driving force receiving portion.

8. The cartridge according to claim 1, wherein the first roller comprises one end and another end opposite to the one end in the first direction, and
the first gear, the driving force receiving portion, and the second gear are positioned at the one end in the first direction.

9. The cartridge according to claim 1, further comprises:
an idling gear to mesh with the first gear and the second gear.

10. The cartridge according to claim 9, wherein the first roller comprises one end and another end opposite to the one end in the first direction, and
the first gear, the driving force receiving portion, the second gear, and the idling gear are positioned at one end in the first direction.

11. The cartridge according to claim 1, wherein the first roller is a supply roller, and the second roller is a developing roller.

12. The cartridge according to claim 1, wherein the first rotational axis is parallel to the second rotational axis.

13. The cartridge according to claim 1, further comprising:
a casing configured to accommodate toner therein, wherein the casing comprises a boss extending in the first direction, the boss being configured to rotatably support the driving force receiving portion in order to prevent the driving force receiving portion from moving in a second direction perpendicular to the first direction.

14. The cartridge according to claim 1, wherein the cartridge comprises a process cartridge comprising a photosensitive drum, and
a developing cartridge configured to be movably attached to the process cartridge and comprising the first roller, the driving force receiving portion, and the first gear.

15. The cartridge according to claim 1, wherein the driving force receiving portion is integral with the first gear.

16. The cartridge according to claim 1, wherein the first roller comprises one end and another end opposite to the one end in the first direction, and
the first gear and the driving force receiving portion are positioned at the one end in the first direction.

17. The cartridge according to claim 1, wherein the driving force receiving portion comprises first and second walls spaced apart from each other in a rotating direction of the driving force receiving portion.

* * * * *